United States Patent [19]

Cusack

[11] Patent Number: 4,603,482
[45] Date of Patent: Aug. 5, 1986

[54] PROBE SHIELD

[75] Inventor: Robert F. Cusack, Grosse Pointe Park, Mich.

[73] Assignee: Valeron Corporation, Northlake, Ill.

[21] Appl. No.: 814,936

[22] Filed: Dec. 30, 1985

[51] Int. Cl.[4] .............................................. G01B 7/02
[52] U.S. Cl. ............................. 33/169 R; 33/172 E; 33/559
[58] Field of Search .................. 33/169 R, 169 C, 551, 33/556, 559, 561, 172 E

[56] References Cited

U.S. PATENT DOCUMENTS

| | | | |
|---|---|---|---|
| 4,441,257 | 4/1984 | Golinelli et al. | 33/561 |
| 4,451,987 | 6/1984 | Cusack | 33/561 |
| 4,477,976 | 10/1984 | Suzuki | 33/169 R |
| 4,510,693 | 4/1985 | Cusack | 33/169 R |
| 4,553,001 | 11/1985 | Kroetsch | 33/561 |

Primary Examiner—Willis Little
Attorney, Agent, or Firm—Charles A. Doktycz

[57] ABSTRACT

A touch probe for detecting contact with a workpiece or other object is disclosed on features a repositionable disc protective shield for the moveable portion of the touch probe. The shield includes a predetermined rest position while providing freedom of movement for the moveable portion.

4 Claims, 1 Drawing Figure

U.S. Patent   Aug. 5, 1986   4,603,482
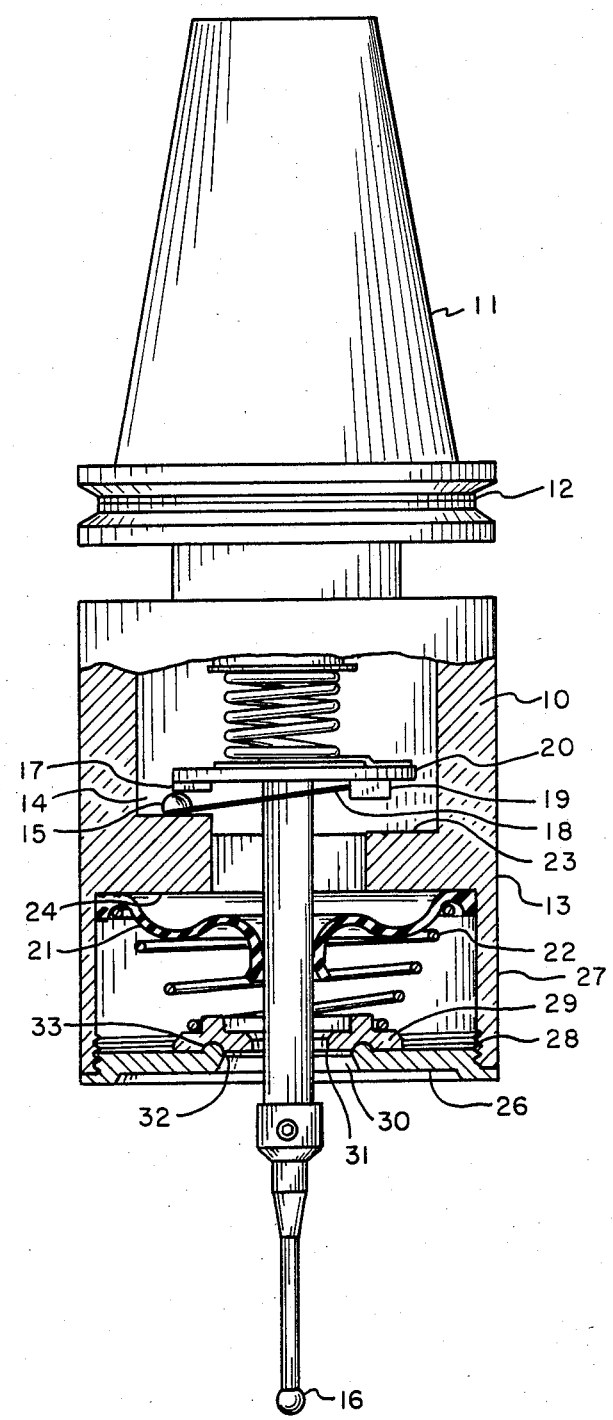

PROBE SHIELD

FIELD OF THE INVENTION

This invention relates generally to position detecting apparatus for use in measuring and gauging systems in automated machine tools and, more particularly, to the construction of a probe for such purposes that includes a protective shield.

BACKGROUND OF THE INVENTION

Automated machining systems and coordinate measurements systems require a precise means for locating surfaces on workpieces. One method of performing such measurement is to utilize a so-called "touch probe" in which a stylus is moved into a position where it touches the surface resulting in a movement of the stylus from its rest position.

The usefulness of these touch probes depends upon their capability of performing accurate repeatable measurements. It is often desirable to provide a probe that is capable of repeating its measurement to within about one micron or less. In other words, if the probe is used to make several measurements on the same workpiece surface, the calculated position thereof cannot deviate more than about one micron.

An important factor in maintaining accuracy of the probes performance is cleanliness. The probe is usually in an environment that includes metal chips and various chemical coolants and lubricants. Therefore the need to seal out dirt and contamination from the innerworkings of the probing device, such as that disclosed in U.S. Pat. No. 4,451,987 has been well established. The problem of providing a flexible, durable seal between the stylus holding-moveable member and the probe housing that does not interfere with probe accuracy and repeatability has, until this invention only been partially approached. The existing approaches for the protection from hot metal chips generated by the machining process are inadequate. Existing art provides an inner flexible diaphragm made of a flexible rubber or plastic material, appropriately convoluted to provide flexibility in the required directions. This type at seal must further be protected by something able to withstand direct contact with hot chips, dust and coolants found in todays machining centers and turning centers. One approach has been to provide a sliding, spherical member closely fitting the stylus holder-moveable member. The closeness of fit and resulting friction and random added on pretravel forces result in reduced repeatability and accuracy in the probe-seal system.

Those skilled in the art appreciate that the manufacture and assembly of probes of this type can be a difficult task. This can present problems which are not easily overcome. The entire probe must be constructed in such a manner that it is rugged and can be used over extended periods of time while also insuring that the accuracy of the probe measurement is not sacrificed. Thus, it is highly desirable to provide a probe construction that can be more easily manufactured while still achieving these high standards.

SUMMARY OF THE INVENTION

The present invention has been developed to obviate the disadvantages of the prior art and to provide an improved touch signal probe of simple construction capable of providing accurate repeatable performance in a hostile machine environment.

To achieve this goal the present invention is characterized by the inclusion of a rugged protective device that practically eliminates unwanted forces on the stylus holder. The probe housing includes an extended section that includes a second chip seal that serves to protect the flexible seal from the aggressive environment in which it is used. The chip seal can be of plastic that is chemically resistant or of metal it is a disc with an aperture whose clearance distance to the stylus moveable member shift exceeds the total distance of the worst case repositional error of the chip seal center to stylus holder center and the pretravel distance of the stylus holder shaft. This the seal will permit the probe to trigger before being affected by the present of the chip sea. Provision's included for repositioning the chip and seal should any exaggerated movement of the stylus shaft be encountered.

BRIEF DESCRIPTION OF THE DRAWING

The various advantages of the present invention will be apparent to one skilled in the art upon reading the following specification and by reference to the drawings which is:

A fragmentary sectional side view of a probe constructed in accordance with the teachings of the present invention.

DESCRIPTION OF THE PREFERRED EMBODIMENTS

In FIG. 1, the techniques of the present invention are shown in connection with a probe 10 whose main housing 13 may be attached to, for example, a machine tool industry standard taper 11 and a drive receiving grooved flange 12, the adapter configured for receipt in a complimentary socket of a machine tool spindle or tool holding turret. While not a necessary portion of the invention, adapter shown as an example of how the touch probe can easily be used in a numerically controlled NC machinery center in the same way as a cutting tool automatically selected and driven in a predetermined path under (NC) control.

Probe 10 includes a stylus 16 which is adapted to come into contact with an object such as a workpiece surface. When the stylus 16 is contacted, it is moved from its rest position thereby resulting in a change in electrical characteristic of the switch assembly 14 whose operation is well known in the art, where a change in the electrical characteristics is detected by suitable electronic circuitry. Upon detection of the stylus contact, circuitry operates to transmit a signal to the machine controller (not shown) to thereby indicate that the stylus 16 has contacted the workpiece surface under investigation. The signal may be transmitted by various proun means.

When the stylus 16 is in its rest position the contacts 15 are urged against their respective discs 17. Each of the three ball-disc pairs comprise a switch and these three switches are electrically connected together in series. The contacts are held in alignment by way of a reed spring 18 having a tab 19 connected to pivot plate carrier 20. The switch assembly 14 is protected from adverse environment conditions by way of a diaphragm 21 held in place by a spring 22 against the outer surface 24 of a front wall flange 23.

The probe is extended beyond the front wall 23 at 25 to form a chamber enclosed by a second front wall 26 replaceably retained in the wall extension 29 by suitably fastening means such as the mating thread at 28. The larger opening 30 for the passage there through of the stylus 16 is further restricted by a disc 29. Disc 29 also includes an aperture 31 for the passage of the stylus 16. Aperture 31 is dimensioned to permit the normal deflection of stylus 30 and to yield should the stylus encounter an abnormal obstruction. This yielding is permitted by the movement of the disc 29 from its rest position. Upon removal of the obstructing condition disc 29 which is resiliently maintained in contact with disc 26 will tend to return to its rest position. This is facilitated by a circular bass surrounding the aperture 30 and a corresponding circular recess or saddle 33 in the contacting surface of disc 29 may also include a second bass or other provision to assist spring 22 in maintaining its relative position against the disc 29.

When stylus 16 contacts an object, it is displaced from its rest position thereby tilting pivot plate carrier 20 and lifting at least one of the ball contacts 15 from its respective disc contact 17. This procedure opens one of the ball-disc switches and is sensed by circuitry causing it to transmit a signal.

It should be understood that the foregoing description contains a specific example of the features of this invention which combined cooperate to provide an extremely efficient protective system for the probe. Various modifications of the specifically illustrated example will become apparent to those skilled in the art upon a study of this disclosure. Accordingly, the invention is to be limited only by the scope and spirit of the appended claims.

What is claimed is:
1. Touch probe apparatus comprising:
   a housing;
   a stylus movable with respect to the housing and extending from a mounting end located within the housing through a first aperture in a front wall of the housing to a stylus contact end located exteriorly of the housing;
   the improvement comprising;
   an extension of said housing beyond the front wall thereof;
   a second front wall including a second aperture through which said probe extends terminating said extension;
   a first resilient seal means surrounding said stylus to seal said first aperture against the entry of foreign matter;
   a disc including an aperture through which said stylus projects encircling said stylus and located between said first front wall and said second front wall in contact with said second front wall;
   and resilient spring means operative to maintain said disc in contact with said second front wall interior surface;
   said disc means further ensuring against the entry of foreign matter.

2. Touch probe apparatus as claimed in claim 1 further including disc positioning means comprising a raised barr on said second front wall interior surface surrounding said second aperture and said disc including a corresponding recess in its contacting surface.

3. Touch probe apparatus as claimed in claim 1 wherein said aperture in said disc is sized to permit normal operating movement of said stylus before encountering contact with said disc.

4. Touch probe apparatus as claimed in claim 3 wherein said aperture in said disc is sized to permit normal operating movement of said stylus before encountering contact with said disc.

* * * * *